(12) United States Patent
Willinger

(10) Patent No.: US 6,202,598 B1
(45) Date of Patent: Mar. 20, 2001

(54) CHEWABLE MOLDED PET TOY

(75) Inventor: Jonathan Willinger, Tenafly, NJ (US)

(73) Assignee: JW Pet Company, Inc., Hasbrouck Heights, NJ (US)

( * ) Notice: Subject to any disclaimer, the term of this patent is extended or adjusted under 35 U.S.C. 154(b) by 0 days.

(21) Appl. No.: 09/271,216

(22) Filed: Mar. 17, 1999

(51) Int. Cl.$^7$ .................................................. A01K 29/00
(52) U.S. Cl. ............................................ 119/709; 119/710
(58) Field of Search .................................. 119/707, 709, 119/710, 711

(56) References Cited

U.S. PATENT DOCUMENTS

| | | | |
|---|---|---|---|
| 2,185,547 | * 1/1940 | Fowler | 119/709 |
| 3,104,648 | * 9/1963 | Fisher | 119/711 |
| 4,771,733 | * 9/1988 | Axelrod | 119/710 |
| 5,263,436 | * 11/1993 | Axelrod | 119/710 |
| 5,339,771 | * 8/1994 | Axelrod | 119/710 |
| 5,419,283 | * 5/1995 | Leo | 119/709 |
| 5,647,302 | * 7/1997 | Shipp | 119/709 |
| 5,673,653 | * 10/1997 | Sherrill | 119/709 |

\* cited by examiner

*Primary Examiner*—Peter M. Poon
*Assistant Examiner*—Elizabeth Shaw
(74) *Attorney, Agent, or Firm*—Helfgott & Karas, P.C.

(57) ABSTRACT

A relatively hard stiff core of molded material such as a thermoplastic elastomer provides a durable base for a softer, more easily chewable overcoat layer formed over the core. The core and overcoat may be molded in the shape of a dog bone. Recesses and/or bores may be formed or molded in the core to receive the overcoat material which flows into the recesses and/or bores to lock the overcoat on the core.

3 Claims, 2 Drawing Sheets

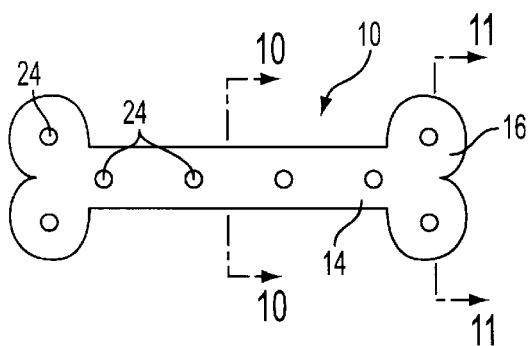 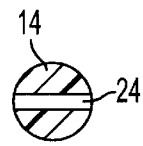 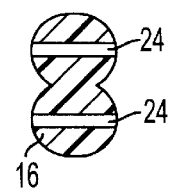
FIG. 9  FIG. 10  FIG. 11
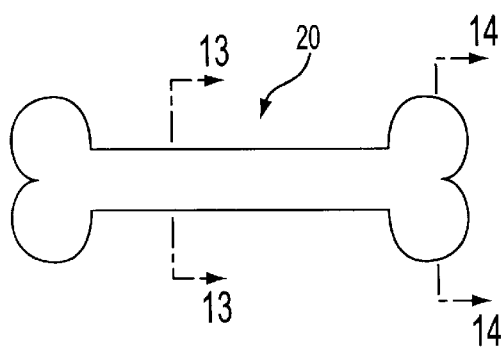 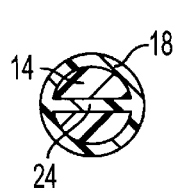 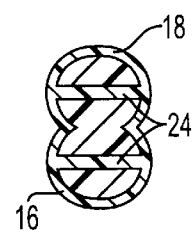
FIG. 12  FIG. 13  FIG. 14
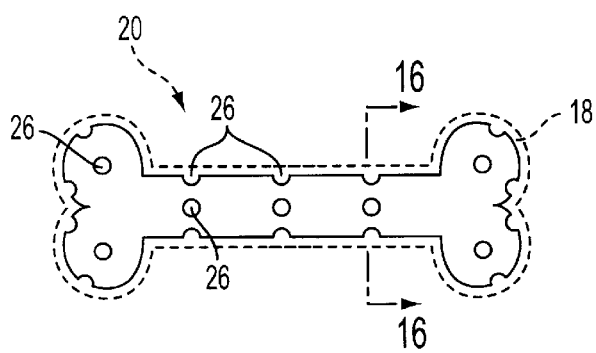 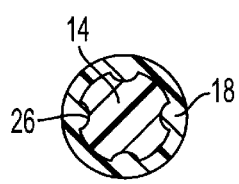
FIG. 15  FIG. 16

CHEWABLE MOLDED PET TOY

BACKGROUND OF THE INVENTION

1. Field of the Invention

The present invention relates in general to molded pet toys and in particular to a pet toy formed with a durable body covered with a softer chewable coating.

2. Description of Prior Developments

Pet chew toys such natural bones and rawhide have long been given to pets for the purposes of amusement and enjoyment as well as for the exercise and health benefits obtained from vigorous chewing. Although pet toys made from natural materials function adequately, they have been in part replaced by more durable materials such as plastic and rubber.

There are currently numerous dog chew items on the market made from various materials including thermoplastics such as nylon and urethane, as well as from natural rubber. Each of these materials has its merits as well as its limitations. For example, molded nylon is an extremely hard material which can be formed into a long-lasting dog chew toy. Unfortunately, many dogs find nylon too hard to chew and avoid chewing on it. Natural rubber, which is softer and easier to deform and chew, is more often acceptable to a dog but is not as durable as nylon and therefore does not last as long in use as nylon.

Accordingly, a need exists for a pet chew toy which is durable yet which is relatively soft to bite and chew.

A further need exists for such a toy which can be molded from two or more materials such as plastic and/or rubber materials of different hardness and/or durometers.

Another need exists for such a chewable pet toy which can be formed with two or more different flavors or fragrances.

SUMMARY OF THE INVENTION

The present invention has been developed to fulfill the needs noted above and therefore has as an object the provision of a chewable pet toy having a durable body covered with a softer chewable material which can be easily resiliently compressed between a pet's teeth and jaws.

Another object of the invention is the provision of a chewable pet toy having a durable nylon body or core which is covered at least in part by a softer covering layer of natural rubber, synthetic rubber, or other softer plastic material.

Yet another object of the invention is the provision of a pet chew toy having a harder core or body having a first flavor or fragrance and having a softer covering layer having a different second flavor or fragrance.

These and other objects are met by the present invention which is directed to a chewable pet toy formed of two or more materials having different material properties, i.e, two different hardnesses. A core and covering layer may be formed by a coinjection plastic molding process with overmolding of the covering layer. This process creates a dog or other pet toy that is highly desirable and acceptable to a dog or other pet since a pet can easily sink its teeth into the covering layer without damaging the toy. In this manner, the toy is highly chewable and yet is also durable and long-lasting.

The core or body of the toy may be molded or otherwise formed as a bone or any other shape which is acceptable to promote chewing. The core may be molded from nylon and may be flavored by impregnation or coating with a beef or other flavorent or fragrance commonly available for use with pet toys. The bone or toy core may then be placed into a second molding machine where a thermoplastic rubber is molded over the core thereby covering all or part of the surface of the bone core.

In one embodiment, the bone or toy core may be molded with holes through it. Thermoplastic rubber from the softer cover layer travels through the holes and through the bone or toy to interconnect the cover layer on opposite sides of the bone core. This prevents the thermoplastic rubber from slipping off the bone or toy in the event that the base or core material and the overmolded material do not fuse during overmolding and the overmolded material is not otherwise sufficiently anchored to the base material.

If the core material and overmolded covering material fuse together or if the overmolded material surrounds a part of the base or core material, the holes may not be necessary. In this case, the bone core typically has no need for holes and the thermoplastic elastomer or rubber is simply molded and fused over sections or all of the bone core.

The bone or toy core, once molded out of a durable hard material such as nylon, can be transferred to a second molding machine. Alternatively, a two-material molding machine can be employed which uses a rotating platen to shuttle the bone or toy core from one material mold to the next.

The softer rubbery outer layer is, to a pet such as a dog, more appealing to chew, while a tough nylon core lasts longer than the soft outer layer and increases the useful life of the outer layer. Other possible material combinations include two different types of thermoplastic elastomers, each optionally having different flavorings or different durometers, two different types of plastics, each having different characteristics, and two different types of biodegradable materials, such as starch based resins, each having different flavorings. Similarly, different colors could be used in the core and covering layer to add to the aesthetic interest and appearance of the chew toy.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 9 is a front elevation view of a core formed in accordance with a third embodiment of the invention;

FIG. 10 is a view in section taken through line 10—10 of FIG. 9;

FIG. 11 is a view in section taken through line 11—11 of FIG. 9;

FIG. 12 is a front elevation view of the core of FIG. 9 overmolded with a softer layer of plastic or rubber;

FIG. 13 is a view in section taken through line 13—13 of FIG. 12;

FIG. 14 is a view in section taken through line 14—14 of FIG. 12;

FIG. 15 is a front elevation view of a core formed in accordance with a fourth embodiment of the invention; and FIG. 16 is a view in section taken through line 16—16 a FIG. 15, after the core has been overmolded with a softer cover layer.

In the various figures of the drawings, like reference characters designate like or similar parts.

DETAILED DESCRIPTION OF THE PREFERRED EMBODIMENTS

Figure 1:
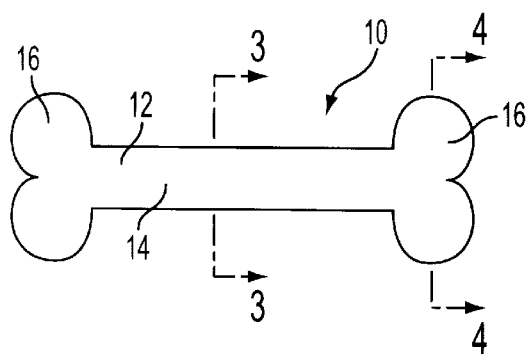
FIG. 1 is a front elevation view of a core formed in accordance with a first embodiment of the invention.
Figure 2:
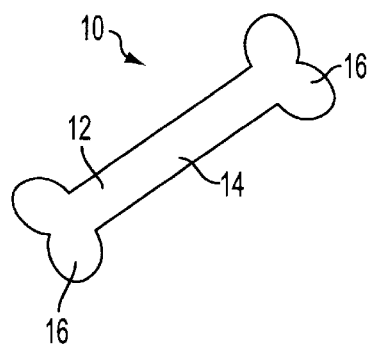
FIG. 2 is a perspective view of the core of FIG. 1.

The present invention will now be described in conjunction with the drawings, beginning with FIGS. 1 and 2 which show a core or body 10 of a chewable pet toy. Core 10 is shown in the shape of a dog bone 12 for the purpose of illustration, however, virtually any shape of core or body may be used. Dog bone core 12 is formed with a central elongated shaft 14 having a pair of bulbous enlarged knobs or condyles 16 formed on opposite ends of the shaft 14.

Figure 3:
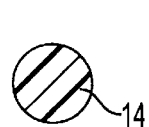
FIG. 3 is a view in section taken through line 3—3 of FIG. 1.
Figure 4:
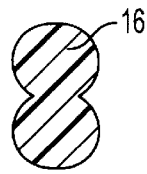
FIG. 4 is a view in section taken through line 4—4 of FIG. 1.

As seen in FIG. 3, the shaft 14 of core 10 may have a circular cross section. Of course, other cross sections such as oval and rectangular may be used. The knobs or condyles 16 may have a figure eight or hourglass cross section as shown in FIG. 4. Again, other condyles 16 may be formed with other cross sections such as round (in the case of spherical condyles) oval or even rectangular sections.

Core 10 is preferably formed of a relatively durable harder material such as a thermoplastic such as nylon or some other wear and chew resistant material. Conventional plastic molding techniques can be used, such as injection molding, to form core 10. In order to produce a desirable chew toy in accordance with the invention, a softer layer or coating 18 of plastic or rubber material is provided over at least a portion of core 10 as shown in FIGS. 5, 6 and 7.

Coating layer 18 may be formed by overmolding a chewable soft material cover layer over the harder and stiffer core 10. Again, injection molding may be used to form layer 18, although other techniques such as a dipping, painting or spraying could also be used. A thermoplastic elastomer may be used to form layer 18.

Figure 5:
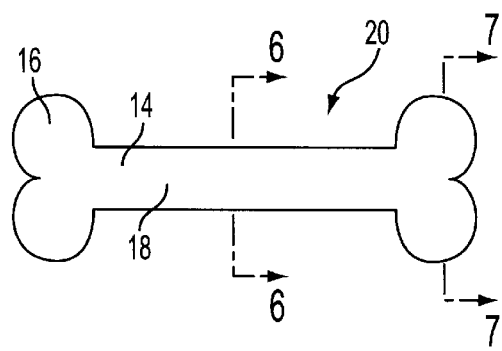
FIG. 5 is a front elevation view of the core of FIG. 1 overmolded with a soft layer of plastic or rubber.
Figure 6:
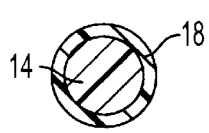
FIG. 6 is a view in section taken through line 6—6 of FIG. 5.
Figure 7:
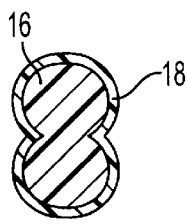
FIG. 7 is a view in section taken through line 7—7 of FIG. 5.
Figure 8:
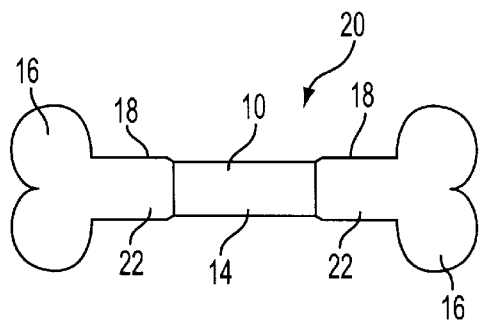
FIG. 8 is a front elevation view of a second embodiment of the invention wherein the core of FIG. 1 is overmolded or coated only on its end portions.

In FIGS. 5, 6 and 7, the entire core 10 is completely encapsulated and overmolded with coating layer 18 to form a chewable pet toy 20. However, as shown in FIG. 8, only a portion or selected portions of the core 10 may be covered by coating layer 18 to form toy 20. In the example of FIG. 8, condyles 16 and a portion 22 of the adjoining ends of shaft 14 are overmolded or otherwise covered with coating layer 18. This example produces sections similar to those shown in FIGS. 3 and 7.

Alternatively, the shaft 14 can be coated or overmolded with a coating layer 18 and the knobs or condyles 16 on core 10 may remain exposed and uncoated so as to produce sections such as those shown in FIGS. 4 and 6. In the example of FIG. 8, the coating layer 18 can be preformed as a sleeve or sock of soft stretchable rubber or plastic material and stretched over each condyle 16 in the manner of a resilient sock. Alternatively, an open ended tubular cylindrical sleeve could be stretched over one of the condyles 16 and pulled onto shaft 14 to cover only the shaft 14 so as to leave the condyles 16 of core 10 exposed.

In order to provide increased retention of cover layer 18 on core 10, one or more through bores or passages 24 are formed through core 10 to provide anchorage to layer 18 as seen in FIGS. 9, 10 and 11. Bores 24 may be formed completely through the shaft 14 as shown in FIG. 11.

When the core 10 of FIG. 9 is overmolded or otherwise encapsulated in a softer cover layer 18 as shown in FIGS. 12, 13 and 14, the cover layer 18 flows into and through the bores 24 so as to interconnect the opposite sides of layer 18 to the interior of core 10. This locks the layer 18 on the surface of core 10 in a secure fashion and resists removal of the layer 18 from the core 10 by chewing, abrading or other mechanical forces applied by a pet.

Rather than form through bores 24 completely through core 10, it is also possible to provide enhanced retention of layer 18 on core 10 by forming dimples, recesses or pockets on the surface of core 10. As seen in FIGS. 15 and 16, a series of small recesses 26 is formed in the surface of core 10 to serve as retention or anchor points for layer 18, which is shown in dashed lines in FIG. 15. Once layer 18 is applied to core 10, the softer material of layer 18 enters and fills each of the recesses 26 and thereby locks layer 18 to core 10 as shown in FIG. 16.

There has been disclosed heretofore the best embodiment of the invention presently contemplated. However, it is to be understood that the various changes and modifications may be made thereto without departing from the spirit of the invention.

What is claimed is:

1. A chewable pet toy, comprising:

a core formed of a first material; and a cover layer formed of a second material different from said first material and provided over at least a portion of said core, wherein said core has at least one bore formed therethrough and wherein said cover layer extends through said bore.

2. A chewable pet toy, comprising:

a core formed of a first material; and a cover layer formed of a second material different from said first material and provided over at least a portion of said core, wherein said core comprises a plurality of bores formed therethrough and wherein said second material is molded through said bores to anchor said cover layer on said core.

3. A chewable pet toy, comprising:

a core comprising a central shaft having opposite end portions and a knob formed on each of said end portions;

a cover layer formed over at least each said knob;

said core formed of a first molded material having a first hardness; and said cover layer formed of a second chewable material having a second hardness less than said first hardness, wherein said core comprises a plurality of bores formed therethrough, and wherein said second material is molded through said bores to lock said cover on said core.

* * * * *